(12) United States Patent
Shivers

(10) Patent No.: US 9,936,803 B2
(45) Date of Patent: Apr. 10, 2018

(54) PORTABLE TABLE ASSEMBLY

(71) Applicant: Jermaine Shivers, Lauderhill, FL (US)

(72) Inventor: Jermaine Shivers, Lauderhill, FL (US)

( * ) Notice: Subject to any disclaimer, the term of this patent is extended or adjusted under 35 U.S.C. 154(b) by 0 days.

(21) Appl. No.: 15/277,586

(22) Filed: Sep. 27, 2016

(65) Prior Publication Data

US 2017/0112277 A1 Apr. 27, 2017

Related U.S. Application Data

(63) Continuation-in-part of application No. 14/471,007, filed on Aug. 28, 2014, now abandoned.

(51) Int. Cl.
| | |
|---|---|
| *A47B 23/00* | (2006.01) |
| *F16M 11/28* | (2006.01) |
| *A47B 23/02* | (2006.01) |
| *F16M 11/10* | (2006.01) |
| *A47B 23/04* | (2006.01) |

(52) U.S. Cl.
CPC .......... *A47B 23/007* (2013.01); *A47B 23/001* (2013.01); *A47B 23/025* (2013.01); *F16M 11/10* (2013.01); *F16M 11/28* (2013.01); *A47B 2023/047* (2013.01)

(58) Field of Classification Search
None
See application file for complete search history.

(56) References Cited

U.S. PATENT DOCUMENTS

| | | | | |
|---|---|---|---|---|
| 1,609,180 A | | 11/1926 | Motono | |
| 2,180,480 A | * | 11/1939 | Richardson | A61M 16/06 128/200.24 |
| 2,199,895 A | * | 5/1940 | Sharp | A47B 31/04 108/4 |
| 2,448,734 A | * | 9/1948 | Phillips | A47B 23/007 248/444.1 |
| 3,095,173 A | * | 6/1963 | Paruolo | B62B 3/0625 248/124.1 |
| 3,680,158 A | * | 8/1972 | Speed | A47C 29/006 108/49 |
| 4,165,856 A | * | 8/1979 | Wiseheart | A47B 97/04 248/161 |

(Continued)

FOREIGN PATENT DOCUMENTS

| | | |
|---|---|---|
| CN | 2271106 | 12/1997 |
| DE | 2029268 | 12/1971 |
| DE | 20216414 | 1/2003 |

OTHER PUBLICATIONS

International Application Serial No. PCT/US15/47523, Written Opinion dated Dec. 4, 2015, 6pgs.

(Continued)

*Primary Examiner* — Muhammad Ijaz
(74) *Attorney, Agent, or Firm* — Jenei LLC

(57) ABSTRACT

A portable table for supporting a book above a user lying in a bed includes a base that may be positioned on a support surface. The base is positioned proximate the bed. A pair of legs is coupled to and extends upwardly from the base. A frame is coupled to the legs. The frame may be positioned above the user lying in the bed. A plurality of rods is movably coupled to the frame. The rods are positionable in a selected configuration so the rods may support the book. The user may read the book.

5 Claims, 15 Drawing Sheets

(56) References Cited

U.S. PATENT DOCUMENTS

| | | | | |
|---|---|---|---|---|
| 4,248,161 A * | 2/1981 | Adair | .................... | A47B 27/02 |
| | | | | 108/6 |
| 4,446,796 A * | 5/1984 | Wilson | ................... | A47B 31/04 |
| | | | | 108/69 |
| 4,938,153 A * | 7/1990 | Maes | ................... | A47B 23/046 |
| | | | | 108/128 |
| 4,966,507 A * | 10/1990 | Hanks | .................. | B23Q 9/0078 |
| | | | | 144/144.1 |
| 5,655,744 A * | 8/1997 | Eisman | ................ | A47B 23/007 |
| | | | | 248/444.1 |
| 7,469,645 B2 * | 12/2008 | Mangano | ............... | A47B 3/002 |
| | | | | 108/115 |
| D637,015 S * | 5/2011 | Rogers | .......................... | D6/681 |
| D690,541 S * | 10/2013 | Rogers | ........................ | D6/675.5 |
| 2005/0184211 A1 * | 8/2005 | Yarbrough | ........... | A47B 23/007 |
| | | | | 248/445 |

OTHER PUBLICATIONS

International Application Serial No. PCT/US15/47523, International Search Report dated Dec. 4, 2015, 2 pgs.

\* cited by examiner

PORTABLE TABLE ASSEMBLY

CLAIM OF PRIORITY UNDER 35 U.S.C. § 120

The present Application for Patent is a continuation-in-part of U.S. patent application Ser. No. 14/471,007, filed on 28 Aug. 2014, entitled "Portable Table Assembly", pending, and assigned to the assignee hereof and hereby expressly incorporated by reference in its entirety herein for all purposes.

BACKGROUND OF THE INVENTION

Field of the Invention

The disclosure relates to table devices and more particularly pertains to a new table device for supporting a book above a user lying in a bed.

Description of the Related Art

Portable tables are often used to positions articles in a convenient position relative to a person seated or reclined proximate to the table. A number of specialty tables exist to hold different types of items, such as laptops, books, food, etc. Many of such portable tables include adjustable surfaces, such as being able to raise or lower a table top. Portable tables that are specifically intended to hold books or other viewable material have a particular challenge in providing sufficient adjustability. Many variations from person to person exist in or for the same person over time as what position the viewable material should be held.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
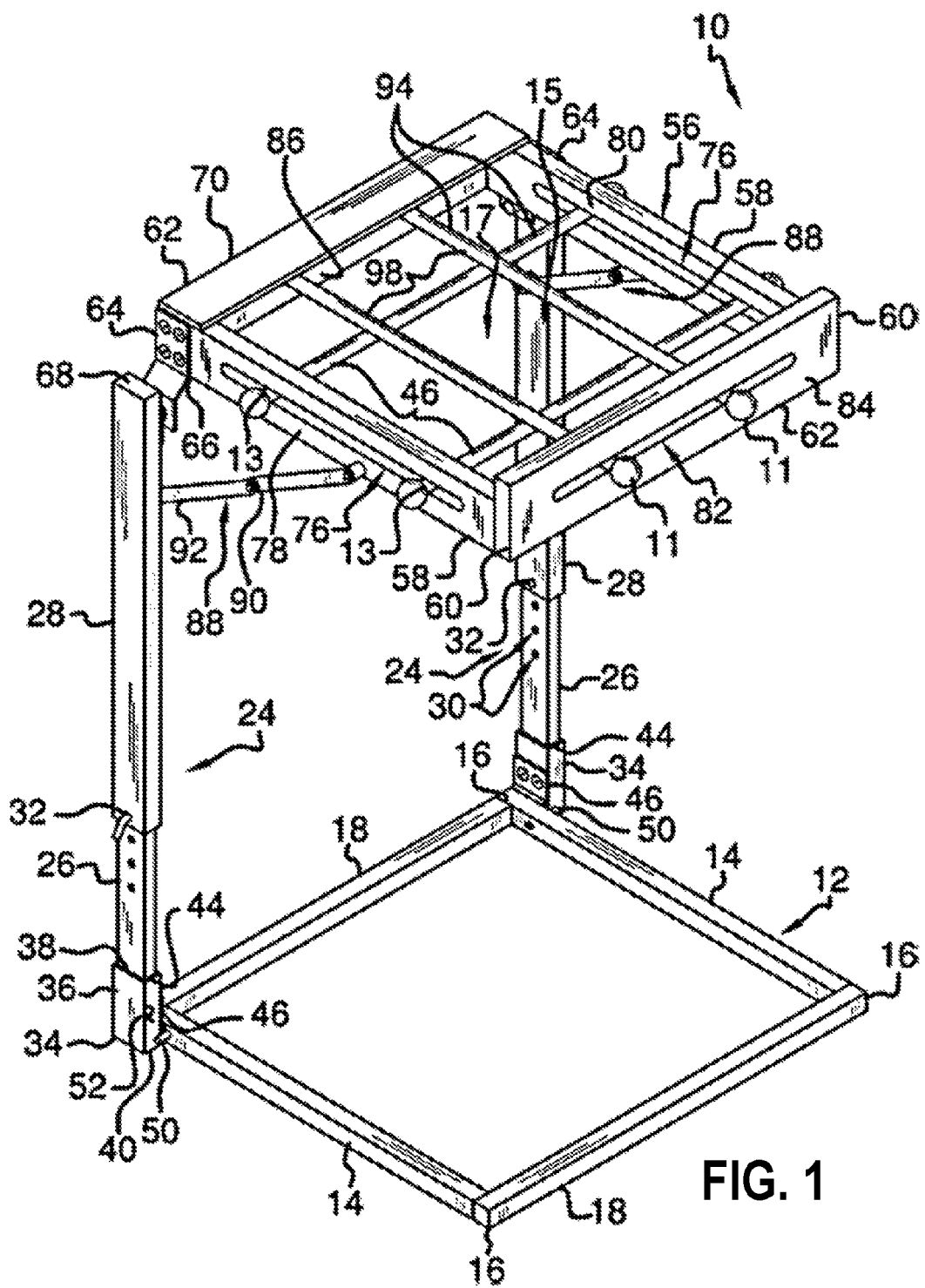
FIG. 1 illustrates a perspective view of a portable table assembly, according to one or more embodiments.
Figure 2:
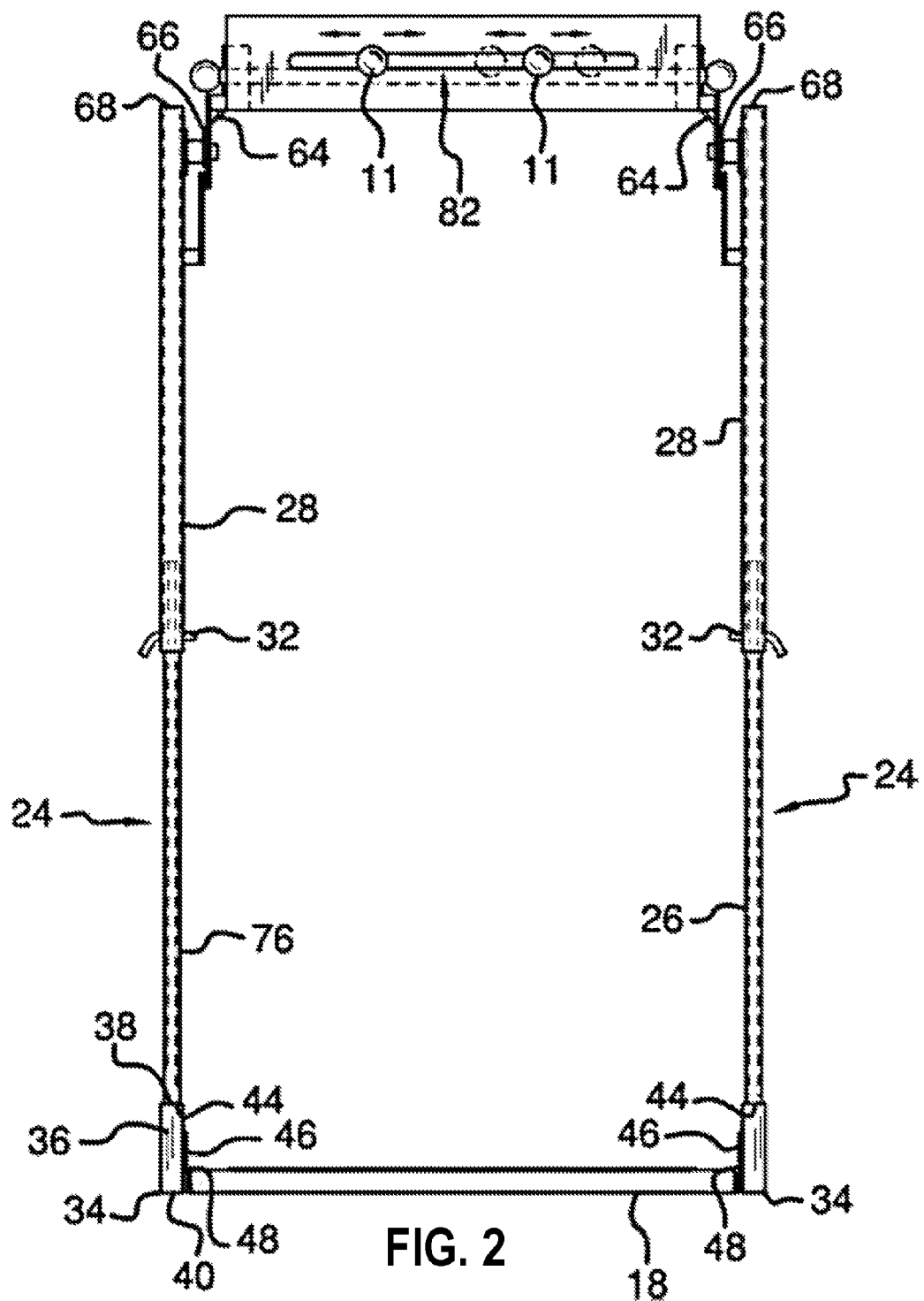
FIG. 2 illustrates a front view of the portable table assembly of FIG. 1, according to one or more embodiments.
Figure 3:
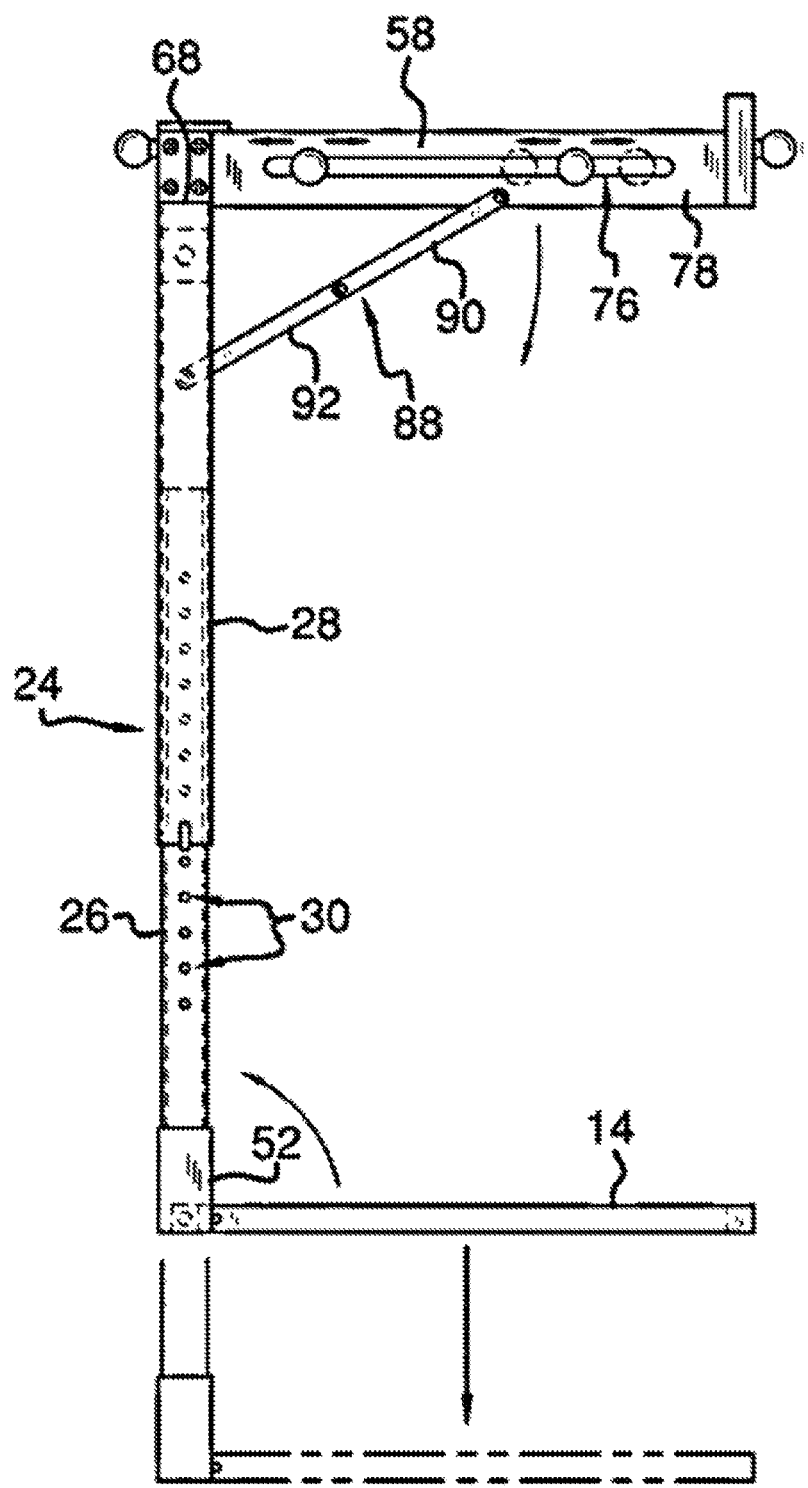
FIG. 3 illustrates a right side view of the portable table assembly of FIG. 1 in a deployed position, according to one or more embodiments.
Figure 4:
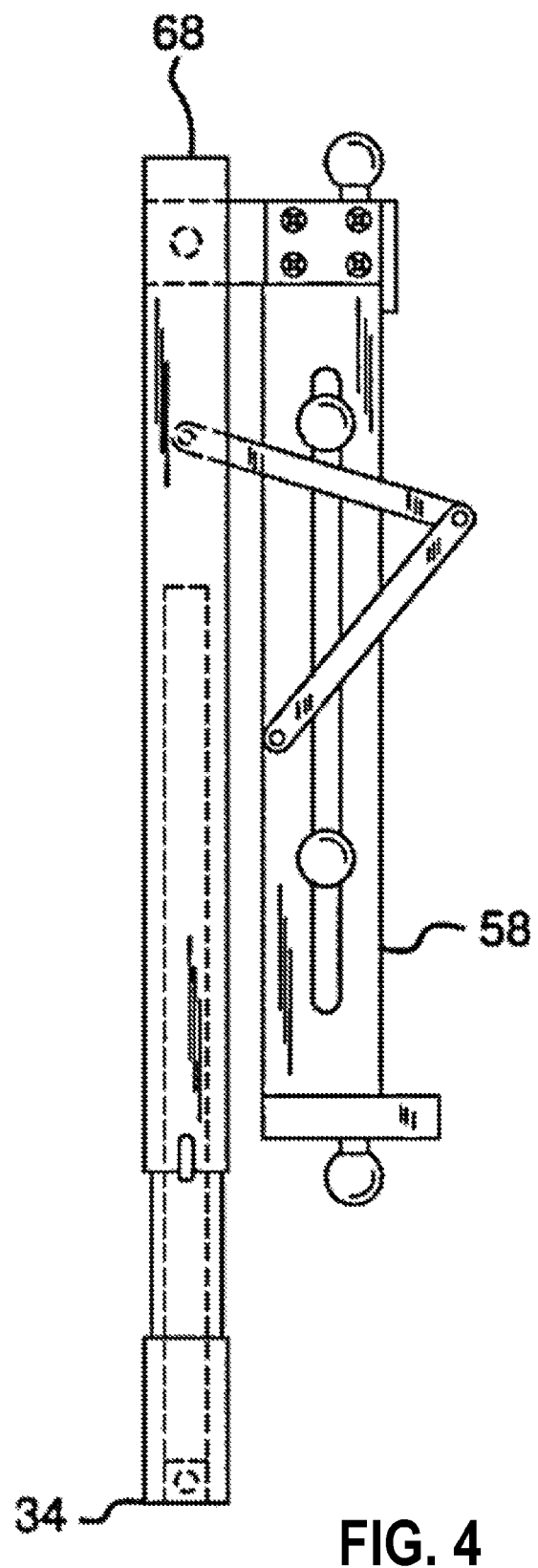
FIG. 4 illustrates a right side view of the portable table assembly of FIG. 1 in a stored position, according to one or more embodiments.

The present disclosure provides in one aspect, a portable table assembly including a base configured to be positioned on a support surface such that the base is positioned proximate to a bed. The portable table assembly includes a pair of legs coupled to and extending upwardly from the base. The portable table assembly includes a frame coupled to the legs such that the frame is configured to be positioned above a user lying in the bed. The portable table assembly includes a plurality of rods movably coupled to the frame. The rods are positionable in a selected configuration such that the rods are configured to support a book wherein the user may read the book. An adjustment mechanism is coupled between the base and the frame to provide a spatial adjustment to an orientation of the frame relative to the base. The adjustment mechanism is a selected one of: (i) a pivotal connection between between a lower portion and an upper portion of each leg selectable between an upright position and a pivoted position; (ii) a pair of horizontal arms pivotally attached at one end to the legs to pivot in a horizontal arc and at another end to the frame; (iii) more than one set of mounting features on the frame, each set of mounting features engage to present the frame in a corresponding spatial orientation; and (iv) a swivel connection between the frame and the two legs allowing the frame to rotate about a longitudinal axis extending orthogonal to the two legs, at least one attachment between the frame and a selected leg being slidable to accommodate a change in relative distance to an attachment between the frame and the other leg as a relative adjustable height between the two legs is made to define a desired degree of swivel of the frame.

In another aspect of the present disclosure, a portable table includes a base configured to be positioned on a support surface such that the base is positioned proximate the bed. A pair of legs is coupled to and extending upwardly from the base. The legs have a top portion. A frame is coupled to the legs such that the frame is configured to be positioned above a user lying in the bed, the frame comprising a pair of basic arms each coupled to and extending between an associated one of opposite ends of a pair of alternative arms of the frame. A top end of the top portion of each of the legs is hingedly coupled to an intersection of an associated one of the basic arms and a rear one of the alternative arms of the frame. Each of the basic arms of the frame have a first slot extending through a first lateral side and a second lateral side of the basic arms. The first slots each extend between the opposite ends of each of the alternative arms of the frame. Each of the alternative arms have a second slot extend through a front side and a back side of the alternative arms. The second slots extend between each of the opposite ends of each of the alternative arms of the frame. A plurality of rods are movably coupled to the frame. The rods are positionable in a selected configuration such that the rods are configured to support a book for reading by a user. The plurality of rods include a first set of the rods. Each of the first set of rods extend through the first slot in each of the basic arms of the frame such that the first rods are each positionable at a selected point along the first slots. The plurality of rods include a second set of the rods. Each of the second set of rods extend through the second slot in each of the alternative arms of the frame such that the second rods are each positionable at a selected point along the second slots. The rods are configured to support the book such that the book may be read through an opening defined by the rods.

In another aspect of the present disclosure, a portable table includes a base that has a pair of first arms. Each of the first arms are coupled to and extend between an associated one of opposite ends of a pair of second arms of the base. The base is configured to be positioned on a support surface such that the base is positioned proximate to a bed. A pair of legs include a bottom portion slidably coupled to a top portion of the legs such that the legs have a telescopically adjustable height. A bottom end of the bottom portion of each of the legs is hingedly coupled to an intersection of an associated one of the first arms of the base and a back one of the second arms of the base such that the legs each extends upwardly from the base. A frame includes a pair of basic arms each coupled to and extending between an associated one of opposite ends of a pair of alternative arms of the frame. A top end of the top portion of each of the legs is hingedly coupled to an intersection of an associated one of the basic arms and a rear one of the alternative arms of the frame such that the frame is configured to be positioned above a user lying in the bed. Each of the basic arms of the frame have a first slot extending through a first lateral side and a second lateral side of the basic arms. The first slots each extend between the opposite ends of each of the alternative arms of the frame. Each of the alternative arms have a second slot extending through a front side and a back side of the alternative arms. The second slots extend between each of the opposite ends of each of the alternative arms of the frame. A plurality of rods include a first set of the rods and a second set of rods. Each of the first set of rods extend through the first slot in each of the basic arms of the frame such that the first rods are each positionable at a selected point along the first slots. Each of the second set of rods extend through the second slot in each of the alternative arms of the frame such that the second rods are each positionable at a selected point along the second slots. Each of the first and second sets of rods intersect one another along a center of the frame to define an opening between the first and second sets of rods such that the rods are configured to support a book wherein the user may read the book through the opening. The first and second sets of rods are positionable such that the opening corresponds to a size of the book.

Turning now to the Drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details. In some instances, well known structures and components are shown in block diagram form in order to avoid obscuring such concepts.

Figure 5:
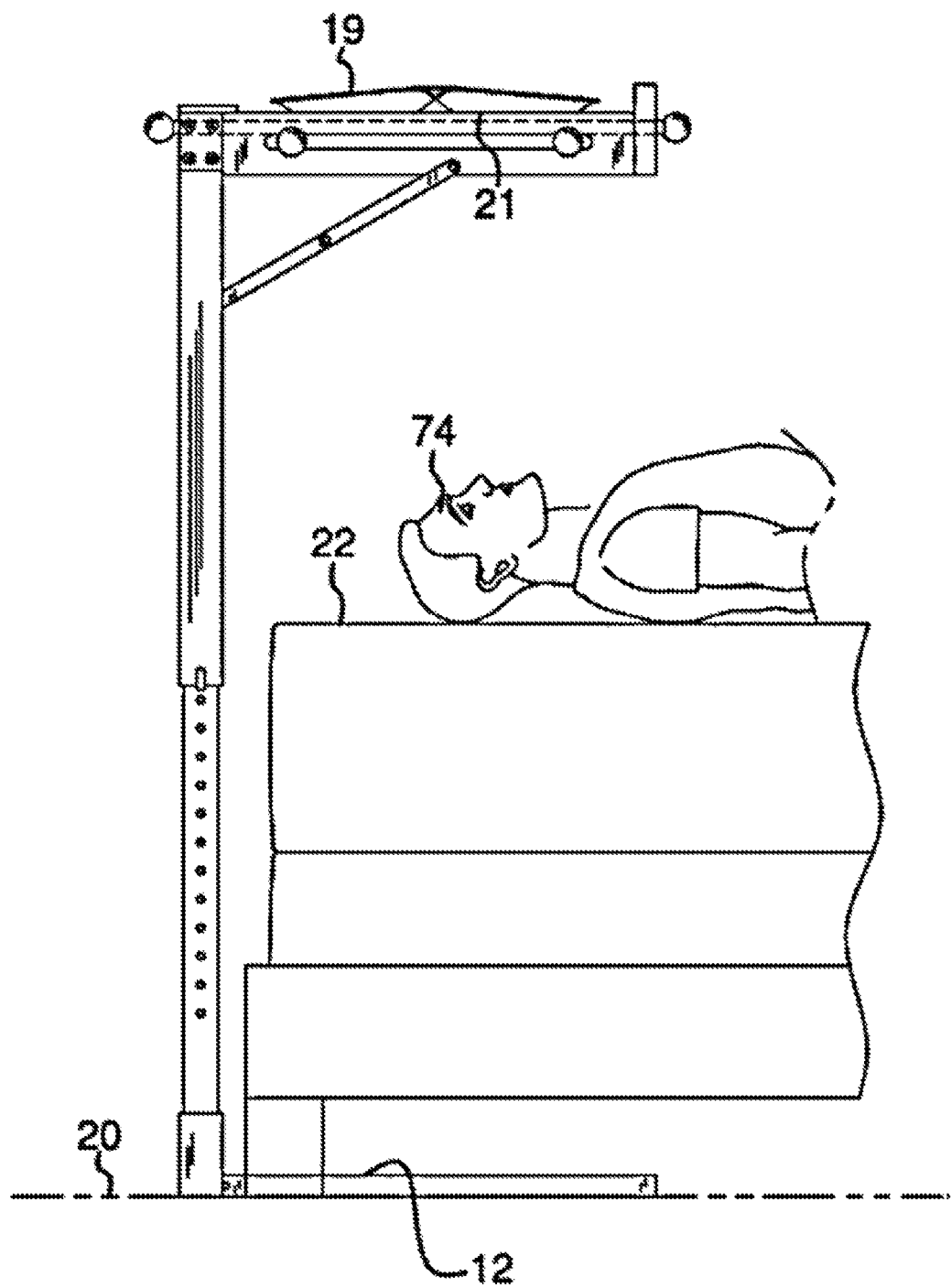
FIG. 5 illustrates a right side view of the portable table assembly of FIG. 1 in a deployed position and proximate to a bed, according to one or more embodiments.

FIGS. 1-5 illustrate a portable table device 10 that includes a base 12. The base 12 comprises a pair of first arms 14 of the base 12 each coupled to and extending between an associated one of opposite ends 16 of a pair of second arms 18 of the base 12. The base 12 may have a rectangular shape. The base 12 may be positioned on a support surface 20. The support surface 20 may be a floor. The base 12 is further positionable proximate a bed 22 (FIG. 5). The bed 22 may be a sleeping bed of any conventional design.

A pair of legs 24 is provided. The legs 24 comprise a bottom portion 26 of the legs 24 slidably coupled to a top portion 28 of the legs 24. Moreover, the legs 24 each have a telescopically adjustable height. The bottom portion 26 of the legs 24 each has a plurality of apertures 30 extending laterally therethrough. The apertures 30 are evenly spaced apart and distributed along an entire length of each of the bottom portions 26 of the legs 24. A pair of pins 32 is extendable through each of the top portions 28 of the legs 24. The pins 32 each engage a selected one of the apertures 30 to retain the legs 24 at a selected height.

A pair of sockets 34 is provided. The sockets 34 each have an outer wall 36 extending between a top end 38 and a bottom end 40 of the sockets 34. The top end 38 of the sockets 34 is open. The outer wall 36 of the sockets 34 is each movably coupled to an intersection of an associated one of the first arms 14 of the base 12 and a back one 42 of the second arms 18 of the base 12. The top end 38 of the sockets 34 each insertably receives a bottom end 44 of the bottom portion 26 of an associated one of the legs 24. The legs 24 each extend upwardly from the associated sockets 34.

A pair of lower brackets 46 is provided. The pair of lower brackets 46 has a centrally positioned bend 48 thereon. The lower brackets 46 each form a Z-shape. Each of the pair of lower brackets 46 is hingedly coupled between the sockets 34 and the associated first arms 14 of the base 12. The pair of lower brackets 46 spaces the sockets 34 laterally away from the associated first arms 14 of the base 12.

The base 12 is positionable in a deployed position. The base 12 extends forwardly away from each of the legs 24. The base 12 is positionable on the support surface 20 when the base 12 is in the deployed position. Additionally, the base 12 is positionable in a stored position. The base 12 is positioned between and is coextensive with the legs 24 when the base 12 is in the stored position.

A pair of pegs 50 is movably coupled to and extends outwardly from an associated one of the first arms 14 of the base 12. The pegs 50 each abut a forward surface 52 of the outer wall 36 of each of the sockets 34 when the base 12 is in the deployed position. The pegs 50 are each selectively pushed inwardly on the first arms 14 of the base 12 to allow the base 12 to be positioned in the stored position.

A frame 56 is provided. The frame 56 comprises a pair of basic arms 58 each coupled to and extending between an associated one of opposite ends 60 of a pair of alternative arms 62 of the frame 56. A pair of upper brackets 64 is provided. The pair of upper brackets 64 each has a centrally positioned bend 66 thereon. The upper brackets 64 each has a Z-shape. Each of the upper brackets 64 is hingedly coupled between a top end 68 of the top portion 28 of the legs 24 and an intersection of an associated one of the basic arms 58 and a rear one 70 of the alternative arms 62 of the frame 56. The upper brackets 64 space the legs 24 laterally away from the basic arms 58 of the frame 56. The base 12 is positionable beneath the bed 22. The pair of legs 24 is each positioned adjacent to the bed 22. The frame 56 may be positioned above a user 74 lying in the bed 22.

Each of the basic arms 58 of the frame 56 has a first slot 76 extending through a first lateral side 78 and a second lateral side 80 of the basic arms 58. The first slots 76 each extend between the opposite ends 60 of each of the alternative arms 62 of the frame 56. Additionally, each of the alternative arms 62 has a second slot 82 extending through a front side 84 and a back side 86 of the alternative arms 62 of the frame 56. The second slots 82 extend between each of the opposite ends 60 of each of the alternative arms 62 of the frame 56.

The frame 56 is positionable in a deployed position. The frame 56 extends forwardly from the legs 24 in the deployed position. The frame 56 is positionable in a stored position. The frame 56 extends downwardly along each of the legs 24 in the stored position.

A pair of hinges 88 is provided. The hinges 88 each comprise a primary arm 90 hingedly coupled to a secondary arm 92. The hinges 88 are each coupled between the top portion 28 of an associated one of the legs 24 and an associated one of the alternative arms 62 of the frame 56. The primary 90 and secondary 92 arms of the hinges 88 are aligned when the frame 56 is in the deployed position. The hinges 88 retain the frame 56 is the deployed position. The primary 90 and secondary 92 arms of the hinges 88 form a V-shape when the frame 56 is in the stored position.

A plurality of rods 94 is provided. The plurality of rods 94 comprises a first set 96 of the rods 94 and a second set 98 of the rods 94. Each of the first set of rods 96 extends through the first slot 76 in each of the basic arms 58 of the frame 56. The first rods 96 are each positionable at a selected point along the first slots 76. Each of the second set of rods 98 extends through the second slot 82 in each of the alternative arms 62 of the frame 56. The second rods 98 are each positionable at a selected point along the second slots 82.

A plurality of balls 11 is each coupled to ends 13 of an associated one of each of the rods 94. The balls 11 may be gripped to manipulate the rods 94. Each of the first 96 and second sets 98 of rods intersects one another along a center 15 of the frame 56 to define an opening 17 between the first 96 and second 98 sets of rods. The rods 94 may support a book 19 so the user 74 may read the book 19 while the user 74 lies in the bed 22. Moreover, the first 96 and second 98 sets of rods are positionable so the opening 17 corresponds to a size of the book 19.

In use, the base 12 and the frame 56 are each positioned in the deployed position. The book 19 is opened and placed on the rods 94 so the pages 21 of the book 19 face downwardly. The user 74 reads the pages 21 of the book 19. The assembly 10 allows the user 74 to read the book 19 without holding the book 19.

Figure 6:
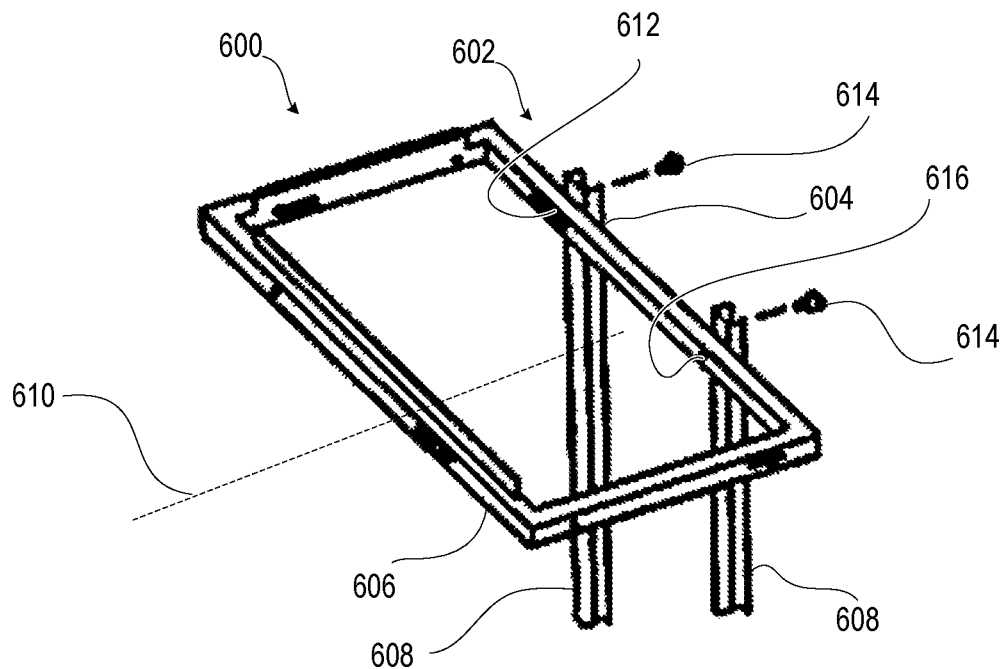
FIG. 6 illustrates a left isometric view of an elongate frame of an example portable table assembly selectively engaged in a transverse orientation, according to one or more embodiments.

FIG. 6 illustrates an example portable table 600 having an adjustment mechanism 602 that includes a swivel connection 604 between an elongate rectangular frame 606 and two legs 608. FIG. 6 illustrates that the swivel connection 604 allows the elongate rectangular frame 606 to rotate about a longitudinal axis 610 extending orthogonal to the two legs 608. At least one attachment between the frame 606 and a selected leg 608 is slidable. For example, the slidable attachment can be provided by a slot 612 formed in the elongate rectangular frame 606 that receives a fastener 614. The other leg 608 is also attached by another fastener 614 to a spaced apart hole 616 on a same lateral side of frame 606. The slot 612 accommodate a change in relative distance to an attachment between the frame 606 and the other leg 608 as a relative adjustable height between the two legs 608 is made to define a desired degree of swivel of the frame 606.

Figure 7:
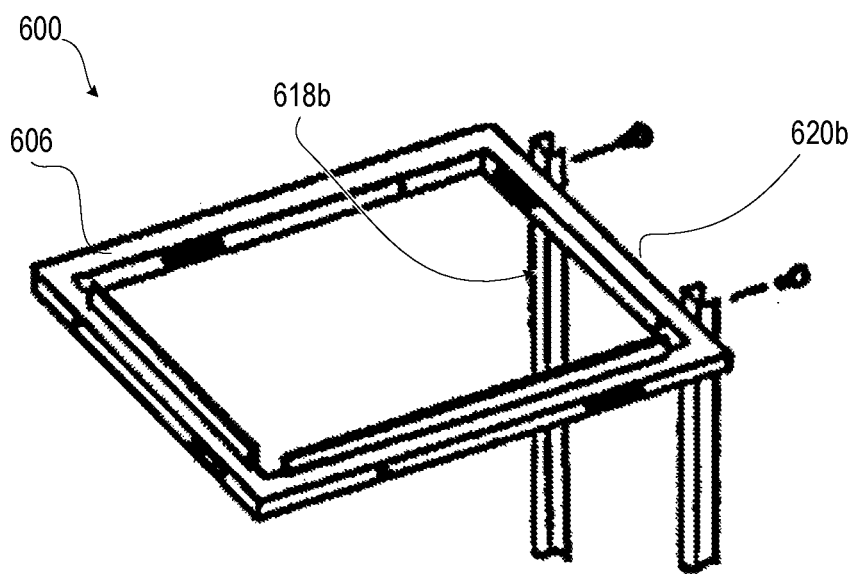
FIG. 7 illustrates a left isometric view of the elongate frame of the example portable table assembly of FIG. 6 selectively engaged in a transverse orientation, according to one or more embodiments.

Alternatively or in addition, the adjustment mechanism 602 can include selectable orientation. Each side of the frame 606 can include a slot 612 and a hole 616 as frame mounting features that allowing different orientations of the elongate rectangular frame 606. For example, a first set 618*a* on a long lateral side 620*a* of the frame 606 can provide a portrait orientation. FIG. 7 illustrates attaching the frame 606 using a second set 618*b* on a short lateral side 620*b*, providing a landscape orientation.

Figure 8:
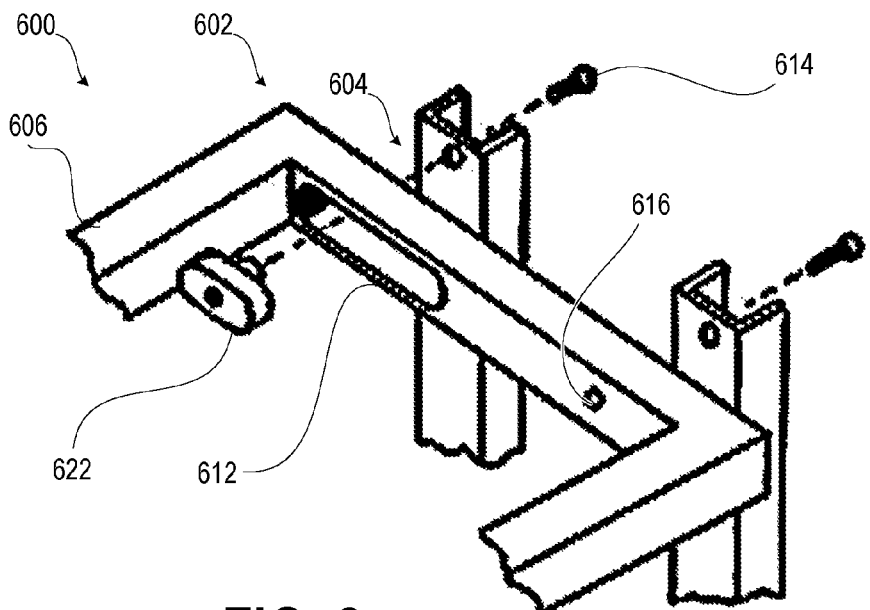
FIG. 8 illustrates a left isometric disassembled view of a swivel connection between a frame and two legs of an example portable table assembly, according to one or more embodiments.
Figure 9:
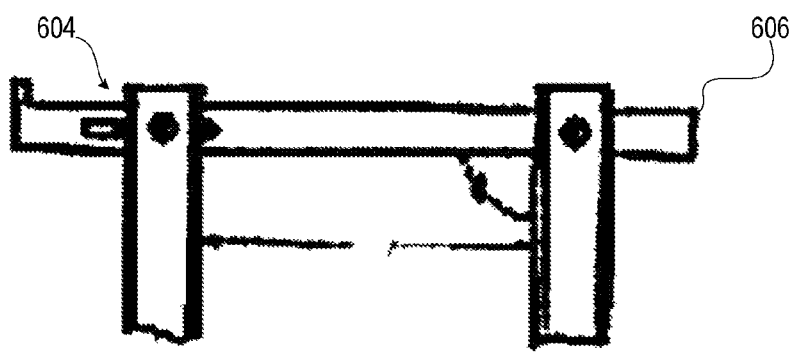
FIG. 9 illustrates a rear side view of the swivel connection of FIG. 8 in a horizontal position, according to one or more embodiments.
Figure 10:
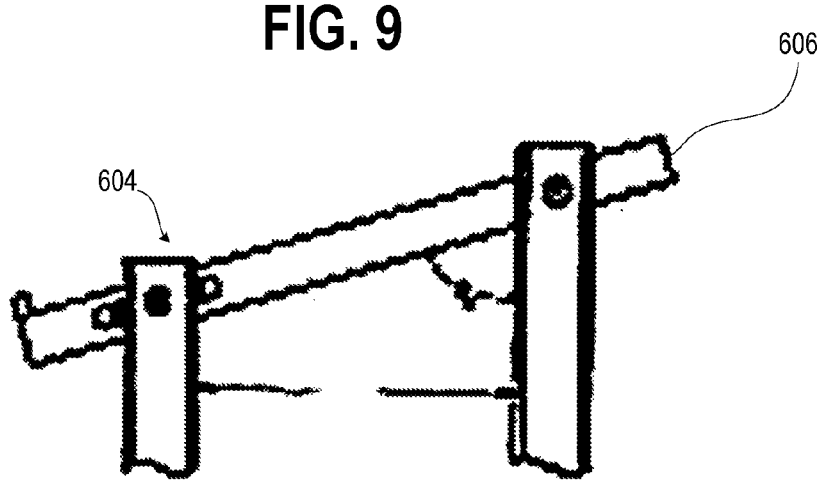
FIG. 10 illustrates a rear side view of the swivel connection of FIG. 8 in a swiveled position, according to one or more embodiments.
Figure 11:
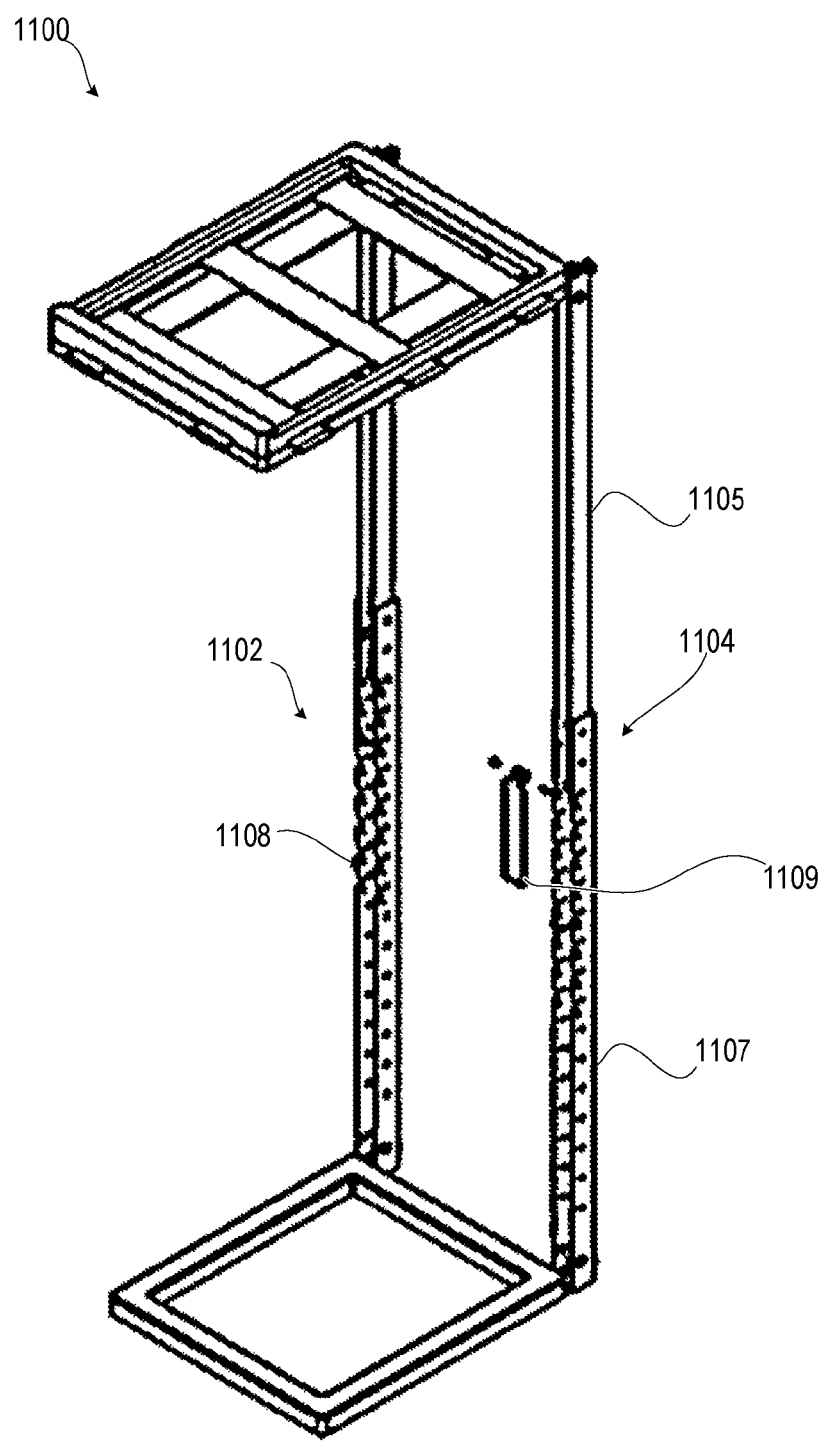
FIG. 11 illustrates a left isometric view of an example portable table assembly with a pivotal connection between upper and lower portions of each leg in a vertical position, according to one or more embodiments.
Figure 12:
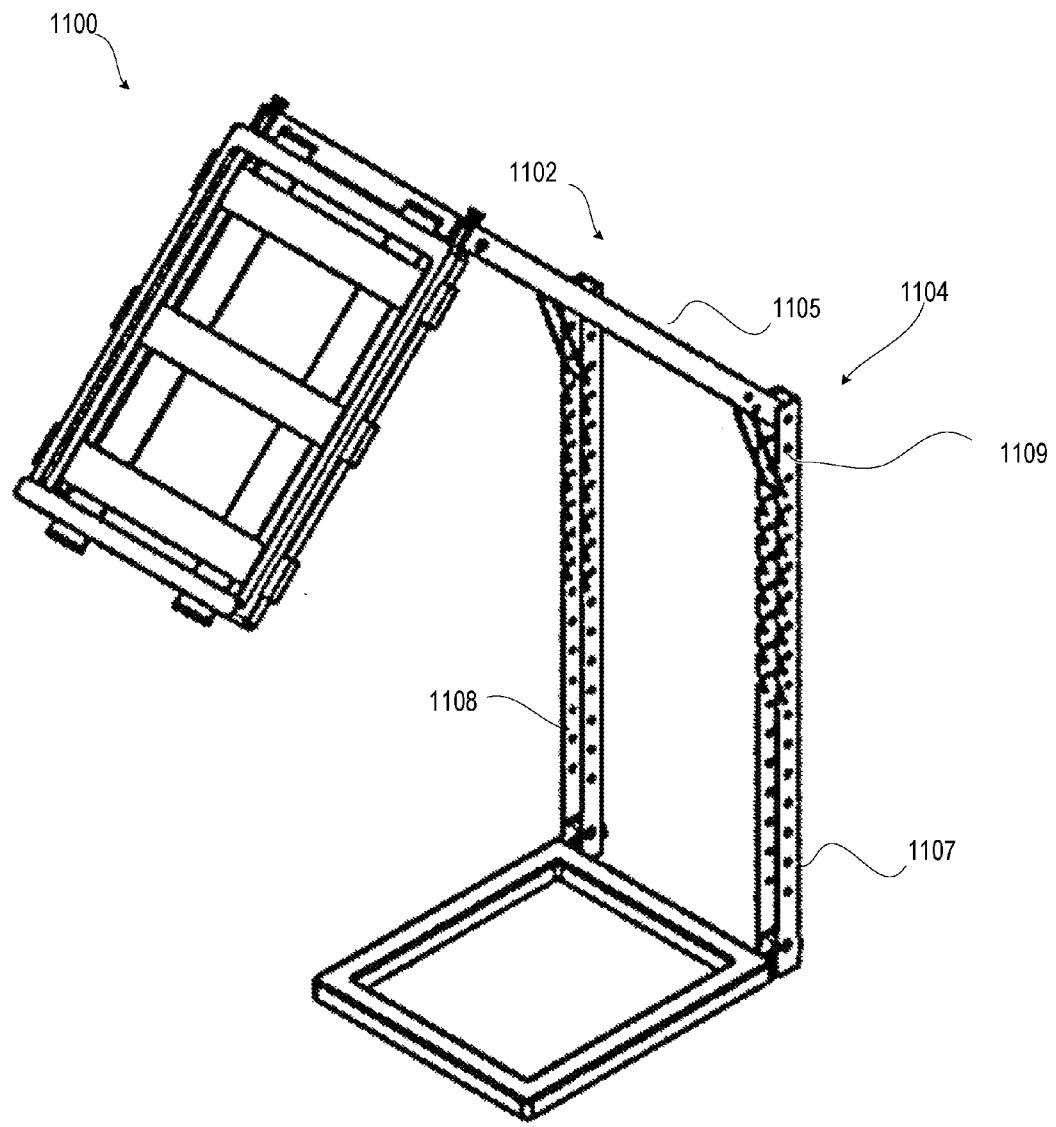
FIG. 12 illustrates a left isometric view of the example portable table assembly of FIG. 11 in the pivoted position, according to one or more embodiments.
Figure 13:
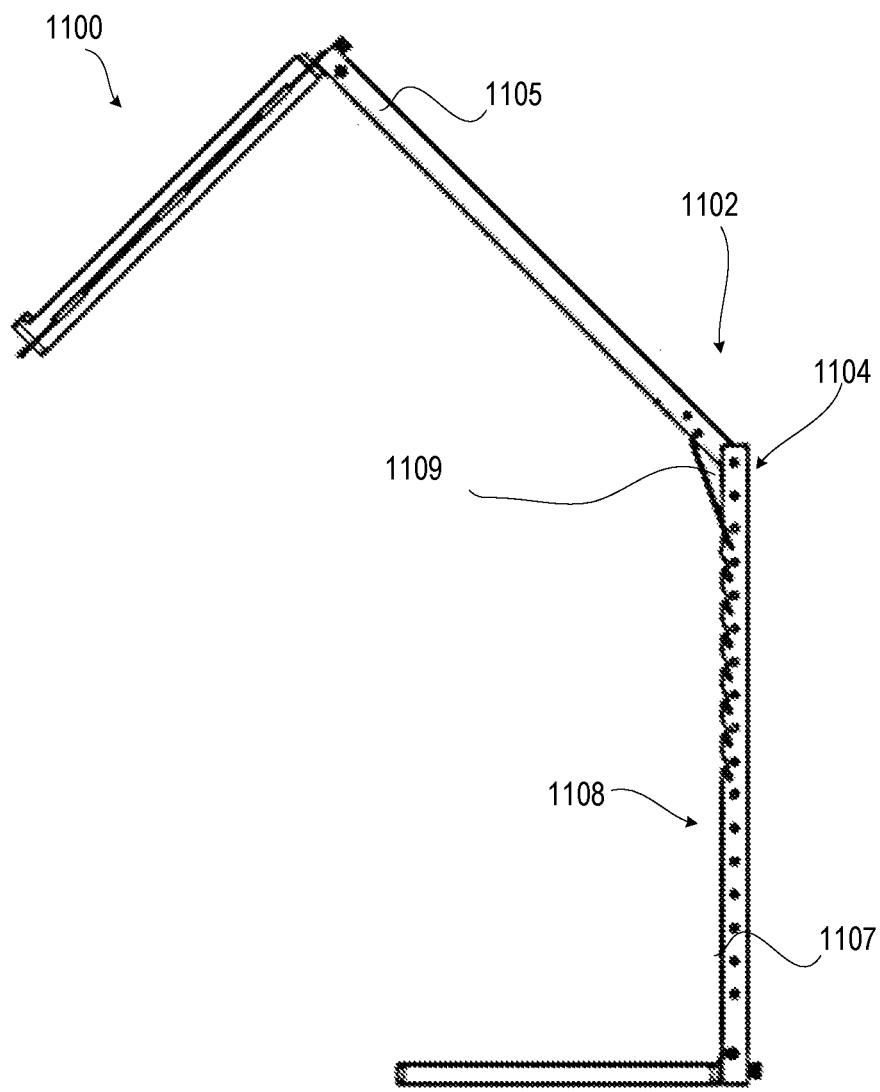
FIG. 13 illustrates a left side view of the example portable table assembly of FIG. 11 in the pivoted position, according to one or more embodiments.

FIG. 8 illustrates that the swivel connection 604 can include an insert 622 that is movable within the slot 612 and held therein by the fastener 614. FIG. 9 illustrates the swivel connection 604 allowing for the frame 606 to be adjusted to a horizontal position. FIG. 10 illustrates the swivel connection 604 allowing for the frame 606 to be adjusted to a swiveled position.

Figure 14:
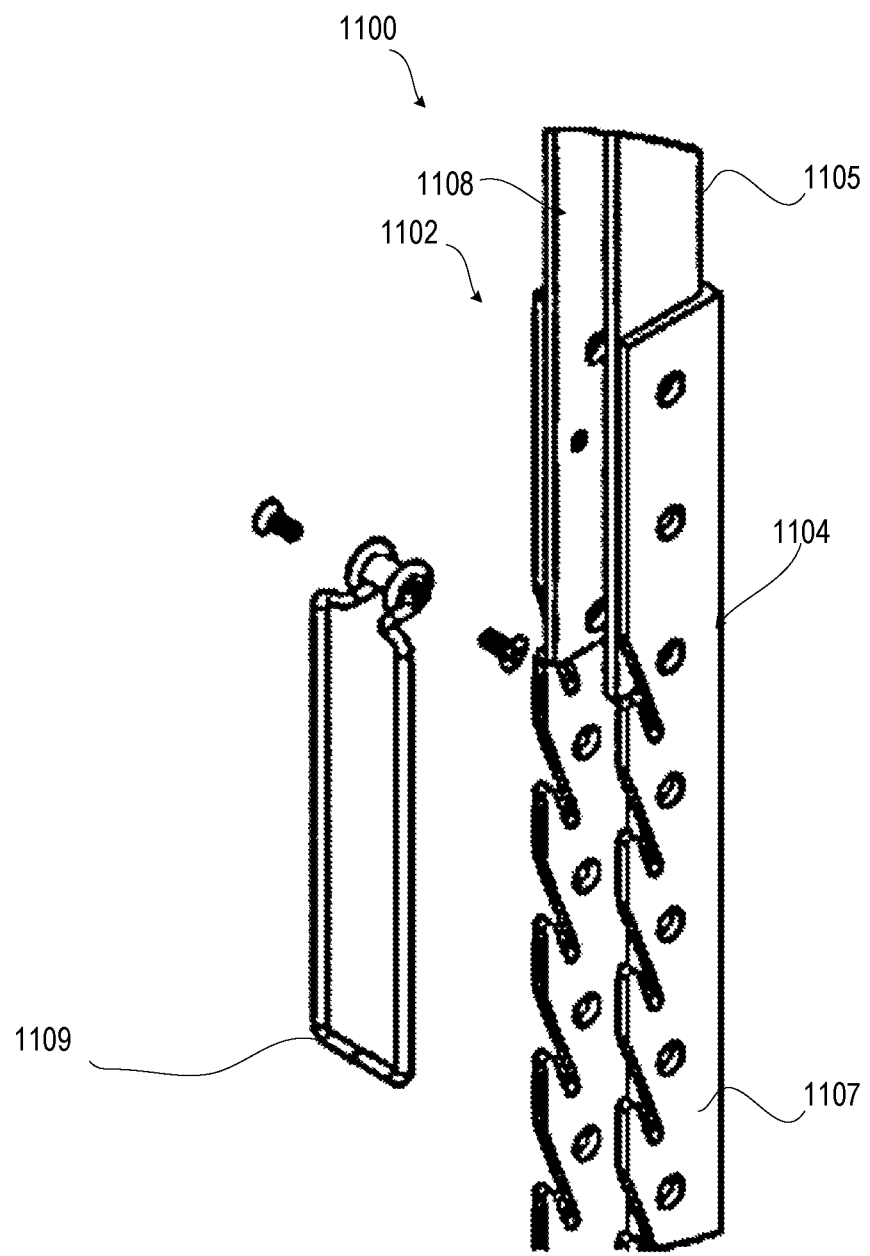
FIG. 14 illustrates a left isometric disassembled view of a pivotal connection of FIG. 11 in a vertical position, according to one or more embodiments.
Figure 15:
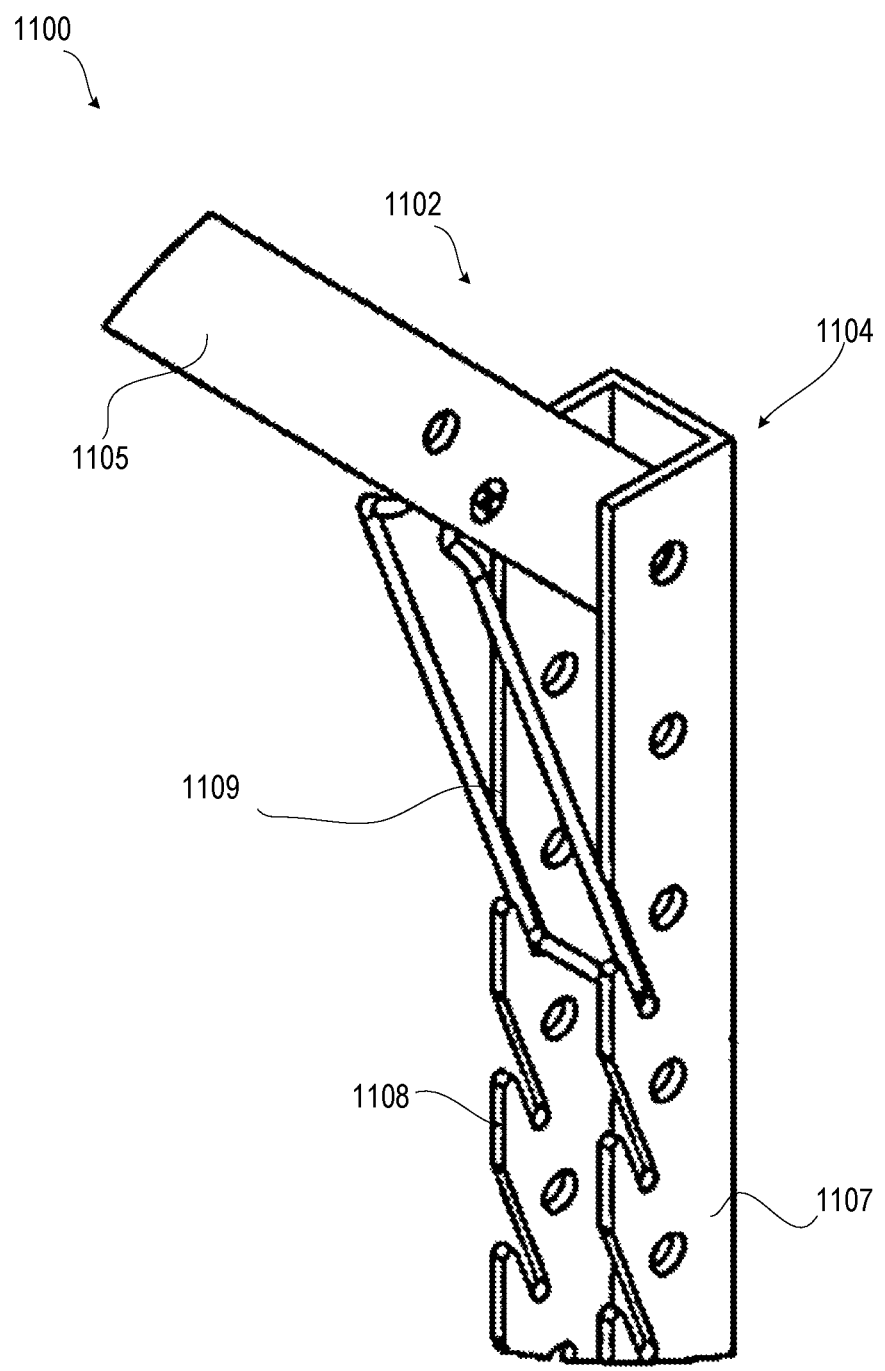
FIG. 15 illustrates a left isometric detail view of the pivotal connection of FIG. 11 in the pivoted position, according to one or more embodiments.
Figure 16:
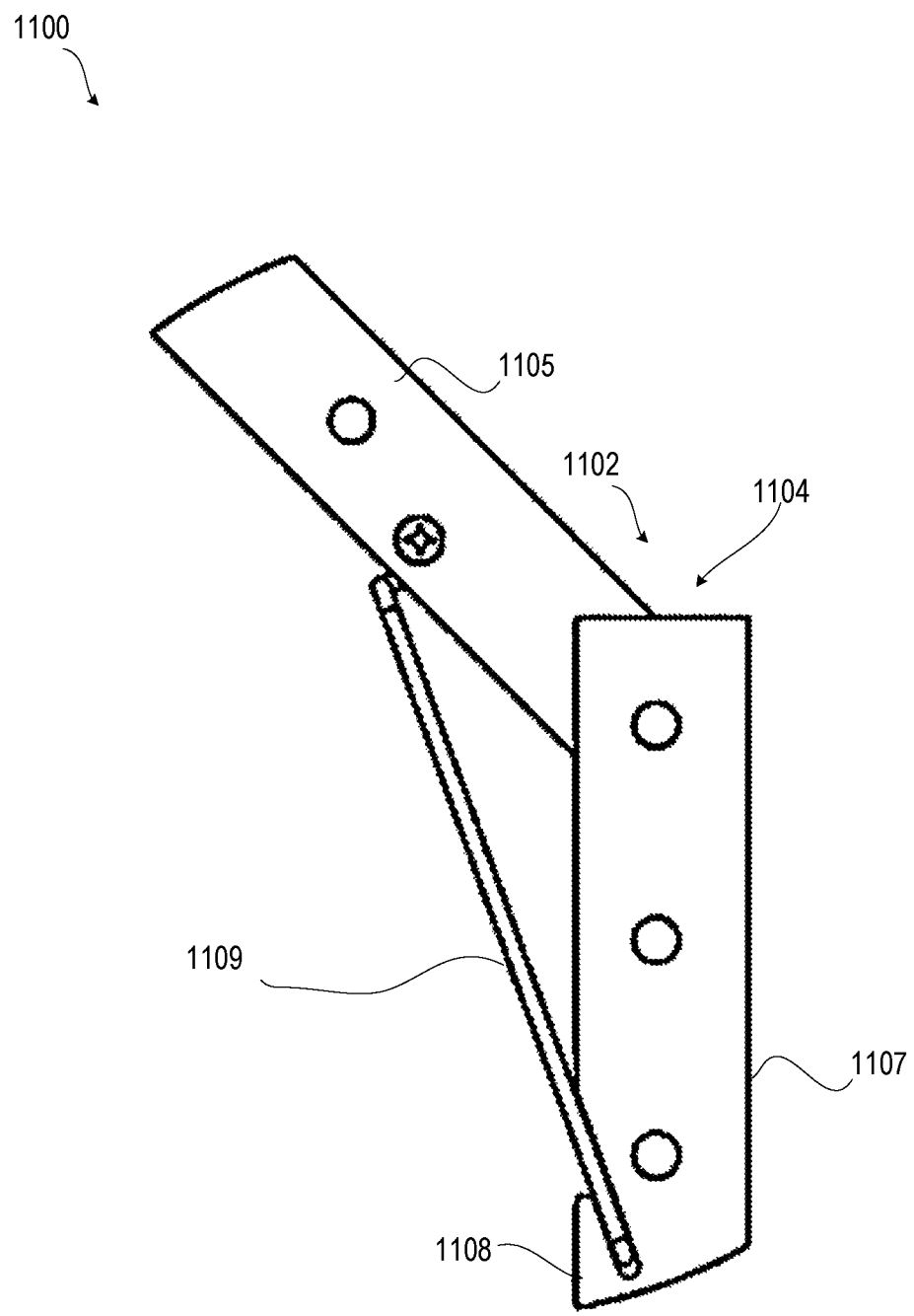
FIG. 16 illustrates a left side detail view of the pivotal connection of FIG. 11 in the pivoted position, according to one or more embodiments.

FIGS. 11-16 illustrate an example portable table 1100 that provide an adjustment 1102 that includes a pivotal connection 1104 formed between an upper portion 1105 and a lower portion 1107 of each leg 1108. One of the upper portion 1105 and the lower portion 1107 of each leg 1108 is vertically and slidingly received within another of the upper portion 1105 and the lower portion 1107. A support arm 1109 is attached to one of the upper and lower portions 1105, 1107 and engages grooves 1109 in the other one of the upper and lower portions 1105, 1107. FIG. 14 illustrates that the upper portion 1105 is received within the lower portion 1107 in a telescoping fashion. The support arm 1109 is a wire formed into a rectangular shape with a top pivot throughhole that can be fastened to the upper portion 1105 of the leg 1108. Grooves 1109 in the lower portion 107 of the leg 1108 receive a bottom end of the support arm 1109. In an exemplary embodiment, a length of the support arm 1109 and its attachmnet point to the upper portion 1105 of the leg 1108 is selected to achieve a 45° angle to the vertical. The grooves 1109 are angled to receive support arm 1109 at an angle less than 45° as the upper portion 1107 is lowered into the pivoted position. FIGS. 15-16 illustrate the support 1109 engaged in a groove 1109 on the lower portion 1107 of the leg 1108 maintaining the upper arm 1105 in a pivoted position.

Figure 17:
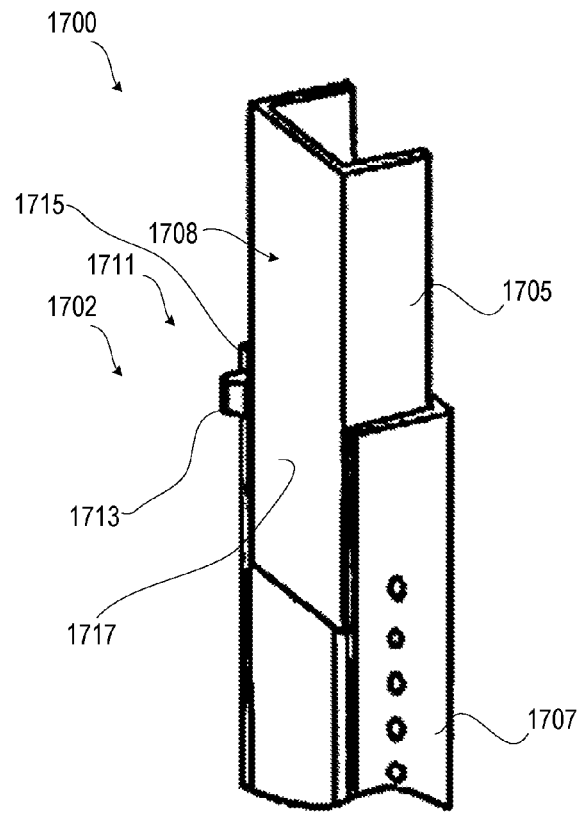
FIG. 17 illustrates a left isometric detail view of a snap lock of a pivotal connection of an example portable table maintaining the vertical position, according to one or more embodiments.
Figure 18:
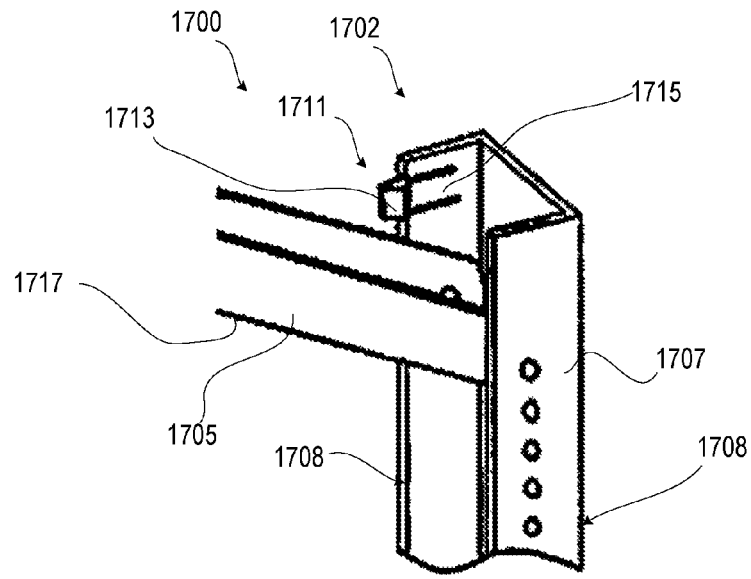
FIG. 18 illustrates a left isometric detail view of the snap lock of the pivotal connection of FIG. 17 released to allow a pivoted position of the legs, according to one or more embodiments.

FIGS. 17-18 illustrate a portable table 1700 that includes an adjustment mechanism 1702 can further include a snap-lock feature 1711 presented on an outer one of the upper and lower portions 1705, 1707 of each leg 1708 that in an unactuated position holds an inner one of upper and lower portions 1705, 1707 in a vertical position. FIG. 17 illustrates a hooked end 1713 of a tab 1715 of the snap-lock feature 1711 engaging a back side 1717 of the upper portion 1705 that is exposed on an open side of a three-sided lower portion 1707 of the leg 1708. The snap-lock feature 1711 maintains the upper portion 1705 of the leg 1708 in the vertical position while allowing telescoping movement. FIG. 16 illustrates that the upper portion 1705 pivoting downward after the hooked end 1713 of the tab 1715 has been urged outward out of contact with the back side 1717.

Figure 19:
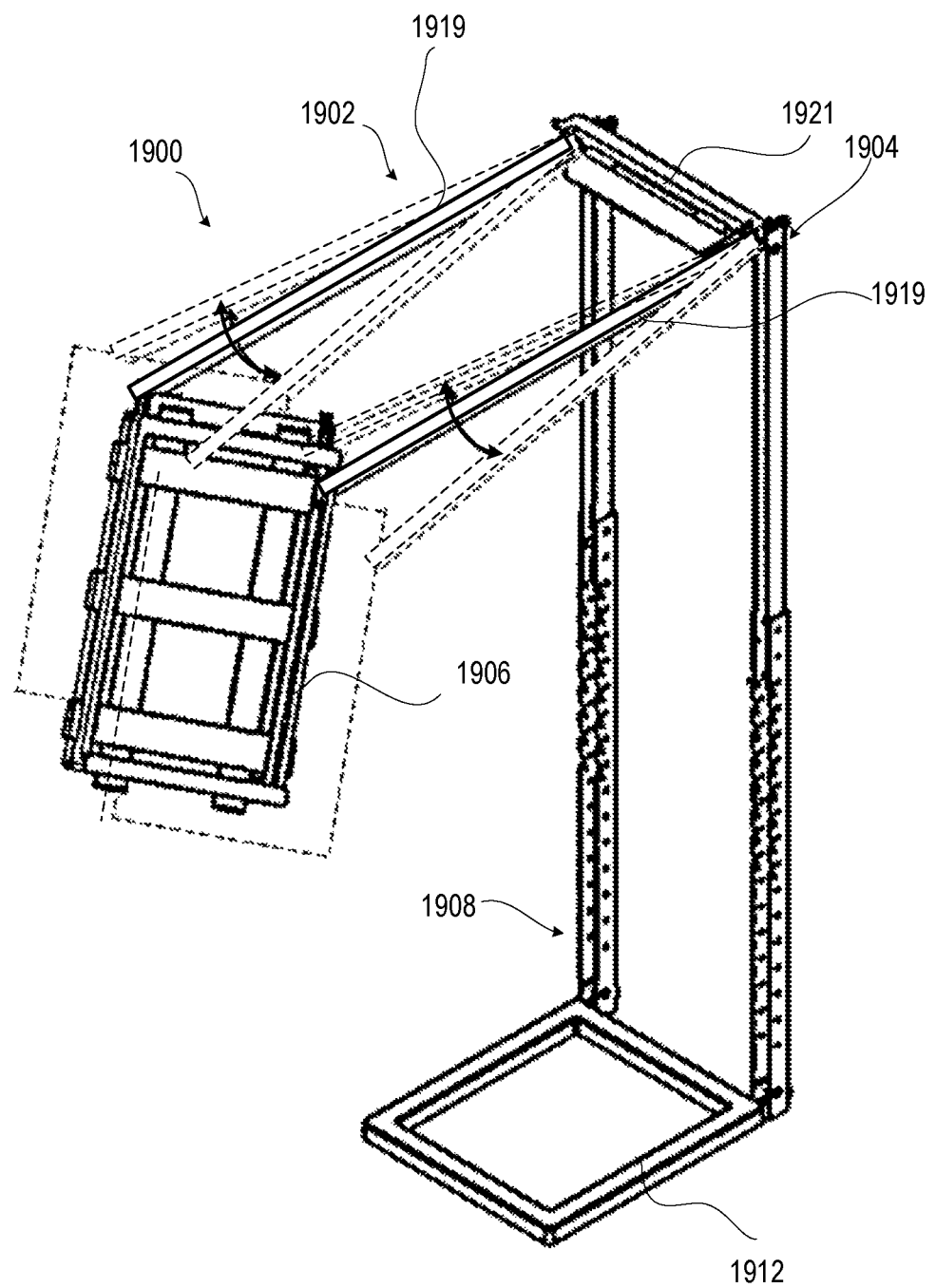
FIG. 19 illustrates a left isometric view of an example portable table assembly with horizontally arcing extension arms, according to one or more embodiments.

FIG. 19 illustrates a portable table 1900 having an adjustment mechanism 1902 provided by inserting a horizontally arcing pair of extension arm 1919 to a top frame 1921 attached across top ends of two legs 1908. Other portions of the legs 1908 can be as described herein for other embodiments. A pivotal connection 1904 between proximal ends of each extension arm 1919 allow rotation in a horizontal arc, allowing some side to side adjustment of frame 1906 without repositioning base 1912.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements. All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is the to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is the to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A portable table comprising:
   a base configured to be positioned on a support surface such that the base is positioned proximate to a bed;
   a pair of legs coupled to and extending upwardly from the base, the legs having a top portion;
   a frame coupled to the legs such that the frame is configured to be positioned above a user lying in the bed, the frame comprising a pair of basic arms each coupled to and extending between an associated one of opposite ends of a pair of alternative arms of the frame;
   a top end of the top portion of the legs each being hingedly coupled to an intersection of an associated one of the basic arms and a rear one of the alternative arms of the frame;
   each of the basic arms of the frame having a first slot extending through a first lateral side and a second lateral side of the basic arms, the first slots each extending between the opposite ends of each of the alternative arms of the frame;
   each of the alternative arms having a second slot extending through a front side and a back side of the alternative arms, the second slots extending between each of the opposite ends of each of the alternative arms of the frame; and
   a plurality of rods movably coupled to the frame, the rods being positionable in a selected configuration such that the rods are configured to support a book wherein the user may read the book,
   wherein the plurality of rods comprising a first set of the rods, each of the first set of rods extending through the first slot in each of the basic arms of the frame such that the first rods are each positionable at a selected point along the first slots,
   wherein the plurality of rods comprising a second set of the rods, each of the second set of rods extending through the second slot in each of the alternative arms of the frame such that the second rods are each positionable at a selected point along the second slots wherein the rods are configured to support the book such that the book may be read through an opening defined by the rods.

2. The portable table of claim 1, further comprising the base comprising a pair of first arms, each of the first arms being coupled to and extending between an associated one of the opposite ends of a pair of second arms of the base.

3. The portable table of claim 1, wherein the legs comprising a bottom portion slidably coupled to the top portion of the legs such that the legs has a telescopically adjustable height.

4. The portable table of claim 3, further comprising:
   the base having a pair of first arms coupled to a pair of second arms of the base; and
   a bottom end of the bottom portion of the legs each being hingedly coupled to the intersection of an associated one of the first arms of the base and a back one of the second arms of the base.

5. A portable table comprising:
   a bed;
   a base, the base comprising a pair of first arms, each of the first arms being coupled to and extending between an associated one of opposite ends of a pair of second arms of the base, the base being configured to be positioned on a support surface such that the base is positioned proximate the bed;
   a pair of legs, the legs comprising a bottom portion of the legs slidably coupled to a top portion of the legs such that the legs has a telescopically adjustable height, a bottom end of the bottom portion of the legs each being hingedly coupled to an intersection of an associated one of the first arms of the base and a back one of the second arms of the base such that the legs each extends upwardly from the base;
   a frame, the frame comprising a pair of basic arms each coupled to and extending between an associated one of opposite ends of a pair of alternative arms of the frame, a top end of the top portion of the legs each being hingedly coupled to an intersection of an associated one of the basic arms and a rear one of the alternative arms of the frame such that the frame is configured to be positioned above a user lying in the bed;
   each of the basic arms of the frame having a first slot extending through a first lateral side and a second lateral side of the basic arms, the first slots each extending between the opposite ends of each of the alternative arms of the frame;
   each of the alternative arms having a second slot extending through a front side and a back side of the alternative arms, the second slots extending between each of the opposite ends of each of the alternative arms of the frame;
   a plurality of rods, the plurality of rods comprising a first set of the rods and a second set of rods;
   each of the first set of rods extending through the first slot in each of the basic arms of the frame such that the first rods are each positionable at a selected point along the first slots;
   each of the second set of rods extending through the second slot in each of the alternative arms of the frame such that the second rods are each positionable at a selected point along the second slots; and
   each of the first and second sets of rods intersecting one another along a center of the frame to define an opening between the first and second sets of rods such that the rods are configured to support a book wherein the user may read the book through the opening, the first and second sets of rods being positionable such that the opening corresponds to a size of the book.

* * * * *